3,277,040
COATING COMPOSITION FOR A FLEXIBLE BASE SHEET AND A METHOD OF PREPARING THE SAME

Edward Barkis, Philadelphia, and Albert D. Collevechio, Chester, Pa., assignors to Avisun Corporation, Philadelphia, Pa., a corporation of Delaware
No Drawing. Filed Mar. 3, 1964, Ser. No. 349,147
9 Claims. (Cl. 260—29.6)

This invention relates to a coating composition, a method of preparing said composition and a composite sheet. More particularly, this invention relates to an aqueous coating composition especially useful for coating flexible base sheets to improve their heat sealability and a method for preparing the aqueous coating composition.

When, for example, uncoated, oriented polypropylene film is heat sealed, excessive shrinking causes unsatisfactory joints. Unoriented polypropylene film requires excessive heat to produce a tight seal which renders the film unsuitable for conventional regenerated cellulose film packaging equipment. Other films, such as those produced from polyethylene terephthalate react in a like manner to heat-sealing procedures. Coating these problem films with a composition which will melt at a suitable lower temperature is a means of overcoming the heat-sealing problem. However, development of suitable compositions for this purpose is difficult since adhesion of the coating to the base is not easily obtained. In addition, coating compositions which have been found most suitable usually employ an organic solvent solution which creates some fire hazard and solvent inhalation problems.

It is a primary object of this invention to provide a composition which is useful for coating flexible polymer base sheets and is applied thereto in an aqueous medium.

It is a further object of this invention to provide a coating composition which will lend heat-sealability to a base sheet and firmly adhere thereto.

It is still a further object of this invention to provide a method for preparing an aqueous coating composition.

It is a still further object of this invention to provide a composite, clear, heat-sealable, non-fibrous, flexible polymer based sheet.

These and other objects are realized in accordance with this invention which comprises a coating composition of a mixture of (1) at least a major proportion of a curable polyester resin having a melting point range of from about 90 to about 120° C., preferably from 100 to 110° C., comprising the esterification product of a polyoxyalkylene ether of a 2-alkylidene diphenol and an acid from the group consisting of fumaric and maleic, the alkylene radical having from 2 to 3 carbon atoms and the alkylidene radical having from 3 to 4 carbon atoms, (2) about 20 to about 40% by weight of an alkyd resin having a melting point range between about 80 and 125° C. comprising the reaction product of an alkylene glycol and a terpene-maleic anhydride condensate, and (3) from about 10 to about 30% by weight of the mixture of a curable liquid bisphenol-epichlorohydrin resin, the sum of the components of the mixture totaling no more than 100%.

The above coating composition is applied to flexible polymer base sheets as a uniform dispersion in an aqueous medium containing from about 1.0 to about 15% of morpholine and from about 2 to about 25% of ammonium hydroxide based on the weight of the medium.

The aqueous coating composition is prepared by first melting the above-described mixture of resins by heating to a temperature corresponding to the melting point of the highest melting resin in the mixture. The melt is then introduced into the aqueous medium containing the morpholine and ammonium hydroxide to provide a homogeneous emulsion or dispersion having a weight ratio of solids to aqueous medium ranging between 1 to 2 and 2 to 1.

The curable polyester resin for this invention is described in U.S. Patent No. 2,634,251. In general, the resin is prepared using conventional esterification techniques and reacting, for example, polyoxyethylene ether of butylidene diphenol, polyoxyethylene ether of isopropylidene diphenol, polyoxypropylene ether of butylidene diphenol, or polyoxypropylene ether of isopropylidene diphenol with fumaric or maleic acid. The anhydride of maleic acid is also used, and for the purpose of this invention, is equivalent to maleic acid. The polyester resin is preferably used in amounts ranging from about 45 to 65% based on the weight of the solid coating composition.

The alkyd resins of this invention are known, available resinous materials derived from the reaction of an alkylene glycol, e.g., ethylene glycol, propylene glycol, diethylene glycol, triethylene glycol, etc. with the condensation product of maleic anhydride or acid with a terpene, e.g., terpinene, terpolene, tripineol, dipentene, pinene, etc. Organic carboxylic acids, fatty oils, rosin, abietyl radical-containing compounds, and the like may be reacted with the glycol-terpene-maleic anhydride components to form a modified product.

The liquid, curable bisphenol-epichlorohydrin resin is preferably prepared by reacting conventional bisphenol A (p,p'-isopropylidene diphenol) or bisphenol B (p,p'-sec-butylidene diphenol) with an excess of epichlorohydrin. This type of epoxide resin is commercially available from several manufacturers.

The basic components of the aqueous medium are necessary to saponify the alkyd resin to produce a stable dispersion. The addition of both the organic base, morpholine, and the inorganic base, ammonium hydroxide, is necessary to the aqueous coating composition of the invention. Morpholine alone, while capable of saponifying the alkyd resin is extremely hard to dry. Ammonium hydroxide is easily dried but will not, by itself, cause saponification of the resin. Together the combination readily produces a stable dispersion and is easily dried. They also provide an aqueous emulsion or dispersion which wets a hydrophobic base sheet such as polypropylene film with ease, a feature not common with aqueous systems unless large amounts of surfactants are present which usually cause haze and loss of adhesion. In addition, the organic amine serves to promote curing of the epoxide resin in the coating process. Other bases tried, such as sodium hydroxide and mono, di or triethanolamine are detrimental to adhesion, heat seal, and/or finished film clarity.

Other additives may be included in the coating composition to improve the surface characteristics of the finished sheet. For example, waxes or wax-like materials are added to the aqueous dispersion in amounts up to about 5% by weight to improve slip characteristics. The wax additive is usually introduced into the aqueous coating composition in emulsified form. Clays or dispersions thereof are also added to the aqueous coating composition in amounts up to about 5% by weight to improve blocking and slip characteristics. In addition, surface active agents such as hexitan esters of fatty acids and polyoxyalkylene derivatives thereof are advantageously used to stabilize the aqueous dispersion.

The coating composition of this invention is preferably applied to polyolefin films, e.g., polypropylene and polyethylene, but other flexible polymer base sheets are also used. These other base materials include polyester, polyamide, polycarbonate and regenerated cellulose sheets.

The base sheets are advantageously pretreated to improve adhesion between the coating and the base film. Anchoring treatments of the film surface include thin coatings of well known anchoring resins, acid treatment and electrical discharge treatment.

The following example is set forth to demonstrate this invention.

*Example*

The following ingredients are melted together at a temperature of 10–115° C.: 50 parts by weight of a curable polyoxyethylene isopropylidene diphenol having a melting point of about 107° C., 30 parts of an alkyd resin consisting of the unmodified reaction product of an ethylene glycol and terpene-maleic anhydride condensate having a melting point range of from 100–110° C., and 20 parts by weight of p,p'-isopropylidene diphenol-epichlorohydrin curable liquid resin.

60 parts by weight of boiling water containing 6 parts of morpholine and 10 parts by weight of ammonium hydroxide is added with stirring to the melted resin mixture after it has cooled to about 100° C. to eventually obtain a resin-in-water emulsion. The dispersion is agitated until cooled to room temperature.

2% of a finely-divided clay and 4% of a wax emulsion comprising 50 weight percent paraffin wax, 11% sorbitan monooleate and 14% of a polyoxyethylene derivative of sorbitan monolaurate dispersed in water is added to the finished dispersion.

This aqueous dispersion was applied to the surface of an electrically treated, biaxially oriented polypropylene film and the coating dried. The clear coating adhered strongly to the base film and produced strong neat heat seals with conventional heat-sealing equipment and temperatures.

Various changes and modifications may be made practicing the invention without departing from the spirit and scope thereof and, therefore, the invention is not to be limited except as defined in the appended claims.

We claim:

1. A coating composition comprising a mixture of (1) at least a major proportion of a curable polyester resin having a melting point range of from about 90 to about 120° C. comprising the esterification product of a polyoxyalkylene ether of 2-alkylidene diphenol and an acid from the group consisting of fumaric and maleic, the alkylene radical having from 2 to 3 carbon atoms and the alkylidene radical having from 3 to 4 carbon atoms, (2) about 20 to about 40% by weight of an alkyd resin having a melting point range between about 80 and 125° C. comprising the reaction product of an alkylene glycol and a terpene-maleic anhydride condensate, and (3) from about 10 to about 30% by weight of a curable liquid bisphenol-epichlorohydrin resin, the sum of the components of the mixture totaling no more than 100%.

2. The coating composition of claim 1 wherein the polyester resin comprises the esterification product of polyoxyethylene ether of isopropylidene diphenol and fumaric acid.

3. The coating composition of claim 1 uniformly dispersed in an aqueous medium containing from about 1 to about 15% of morpholine and from 2 to about 25% of ammonium hydroxide based on the weight of said medium.

4. The coating composition of claim 3 wherein the polyester resin comprises the esterification product of polyoxyethylene ether of isopropylidene diphenol and fumaric acid.

5. A method of preparing an aqueous coating composition which comprises melting a mixture of (1) at least a major proportion of a curable polyester resin having a melting point range of from about 90 to about 120° C. comprising the esterification product of a polyoxyalkylene ether of 2-alkylidene diphenol and an acid from the group consisting of fumaric and maleic, the alkylene radical having 2 to 3 carbon atoms and the alkylidene radical having 3 to 4 carbon atoms, (2) about 20 to about 40% by weight of a mixture of an alkyd resin having a melting point range of from about 80 to about 125° C. comprising the reaction product of an alkylene glycol and a terpene-maleic anhydride condensate, and (3) from about 10 to about 30% by weight of the mixture of a curable liquid bisphenol-epichlorohydrin resin, the sum of the components of the mixture totaling no more than 100%; and dispersing the melted mixture in an aqueous medium containing from about 1 to 15% of morpholine and from about 2 to about 25% of ammonium hydroxide based on the weight of the aqueous medium, the weight ratio of melted mixture to aqueous medium ranging between 1 to 2 and 2 to 1.

6. The method of claim 5 wherein the polyester resin is the esterification product of polyoxyethylene ether of isopropylidene diphenol and fumaric acid.

7. A composite sheet comprising a non-fibrous, flexible, polymer base sheet having a coating on at least 1 side thereof comprising a mixture of (1) at least a major proportion of a curable polyester resin having a melting point range of from about 90 to about 120° C. comprising the esterification product of a polyoxyalkylene ether of 2-alkylidene diphenol and an acid from the group consisting of fumaric and maleic, the alkylene radical having 2 to 3 carbon atoms and the alkylidene radical having 3 to 4 carbon atoms (2) about 20 to about 40% by weight of the mixture of an alkyd resin having a melting point range of from about 80 to about 125° C. comprising the reaction product of an alkylene glycol and a terpene-maleic anhydride condensate, and (3) from about 10 to about 30% by weight of the mixture of a curable liquid bisphenol-epichlorohydrin resin, the sum of the components of the mixture totaling no more than 100%.

8. The composite sheet of claim 7 wherein the base sheet is polypropylene film.

9. The composite sheet of claim 7 wherein the polyester resin is the esterification product of polyoxyethylene ether of isopropylidene diphenol and fumaric acid.

References Cited by the Examiner

UNITED STATES PATENTS

| 2,378,230 | 6/1945  | Little   | 260—29.2 |
| 2,634,251 | 4/1953  | Kass     | 260—863  |
| 2,691,007 | 10/1954 | Cass     | 260—835  |
| 2,908,660 | 10/1959 | Belanger | 260—835  |

MURRAY TILLMAN, *Primary Examiner.*

J. C. BLEUTGE, *Assistant Examiner.*